DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 453

T905,008
APPARATUS FOR LIQUID TREATMENT OF FILAMENTS

Donald Charles Kiscaden, 303 Valley View Drive, Baldwin Acres, Staunton, Va. 24401

Filed Jan. 5, 1972, Ser. No. 215,614
**Int. Cl. D06c *1/00***
U.S. Cl. 28—59
1 Sheet Drawing. 6 Pages Specification

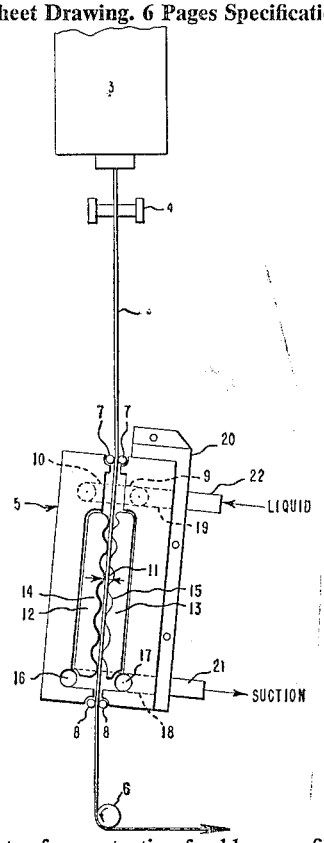

An apparatus for contacting freshly spun filaments with a liquid that includes a pair of undulating surfaces which together define two opposing walls of a serpentine channel through which the filaments pass downwardly in a substantially straight path from an inlet at the top to an exit at the bottom of the apparatus. Means are provided near the top of the channel for contacting the filaments with liquid and in operation the structure of the serpentine channel forces at least a portion of the liquid to make a plurality of passes through the filaments. A vacuum take-off for the liquid is provided which comprises a recess in each of the undulating surfaces near the exit of the channel, each recess being connected to a source of suction to remove liquid entering the recess. The liquid may be water or an aqueous solution of spinning solvent used to cool the filaments after spinning.

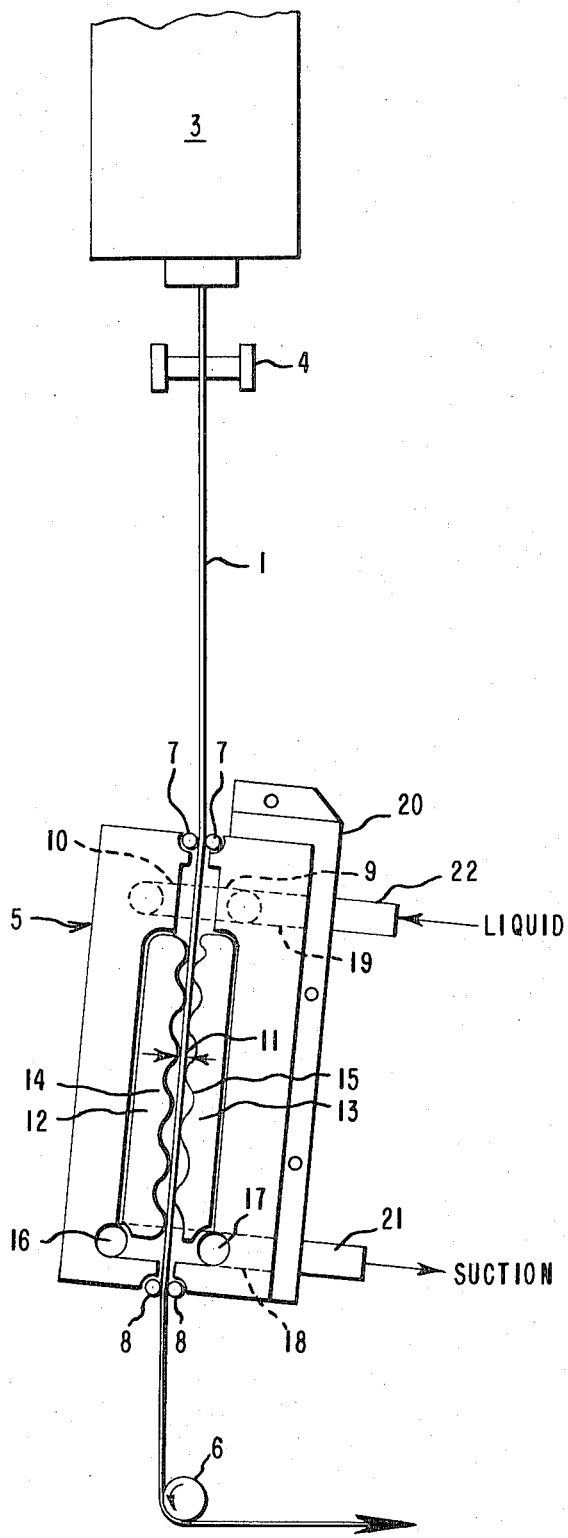

Dec. 19, 1972 D. C. KISCADEN T905,008
APPARATUS FOR LIQUID TREATMENT OF FILAMENTS
Filed Jan. 5, 1972